United States Patent [19]

Einarson et al.

[11] Patent Number: 4,799,187

[45] Date of Patent: Jan. 17, 1989

[54] MEMORY ADDRESS GENERATOR WITH DEVICE ADDRESS TYPE SPECIFIER

[75] Inventors: Jeffrey W. Einarson, Lowell; Kin-Ling Cheung, North Andover, both of Mass.

[73] Assignee: Wang Laboratories, Inc., Lowell, Mass.

[21] Appl. No.: 80,722

[22] Filed: Jul. 30, 1987

[51] Int. Cl.$^4$ .................. G06F 12/00; G06F 13/36
[52] U.S. Cl. .................................................. 364/900
[58] Field of Search ... 364/200 MS File, 900 MS File

[56] References Cited

U.S. PATENT DOCUMENTS

| | | | |
|---|---|---|---|
| 3,982,231 | 9/1976 | Bernstein et al. | 364/200 |
| 4,090,237 | 5/1978 | Dimmick | 364/200 |
| 4,633,437 | 12/1986 | Mothersole et al. | 364/900 |
| 4,658,350 | 4/1987 | Eggebrecht et al. | 364/200 |

*Primary Examiner*—Gareth D. Shaw
*Assistant Examiner*—Paul Kulik
*Attorney, Agent, or Firm*—Michael H. Shanahan; Gordon E. Nelson

[57] ABSTRACT

Address generating apparatus for use in a computer system which includes a bus processor, a memory requiring 24-bit addresses, and a plurality of I/O processors, some of which generates 22-bit addresses and others of which generate 24-bit addresses on a system bus connecting them with the memory. The apparatus provides a 2-bit prefix to the address on the system bus when the address on the bus comes from a 22-bit device. The 22-bit devices are specified by a mask register and the prefixes by a set of prefix registers, one for each of the devices. When bus grant logic in the computer system determines which of the devices is to have control of the system bus, logic in the address generating apparatus determines from the mask register whether the device which is to receive control requires a prefix. If it does, the address generating apparatus outputs the device's prefix to the system bus's two most significant address lines at the same time as the device outputs a 22-bit address to the remaining address lines. The mask register and the prefix register are loadable from the bus processor by means of a bus which is independent of the system bus. On system initialization, the bus processor loads the mask register as required for the I/O devices on the system. During system operation, the bus processor loads prefixes for 22-bit devices as required for the devices to generate addresses for the area of memory from or to which the device is transferring data.

9 Claims, 2 Drawing Sheets

COMPUTER SYSTEM 101

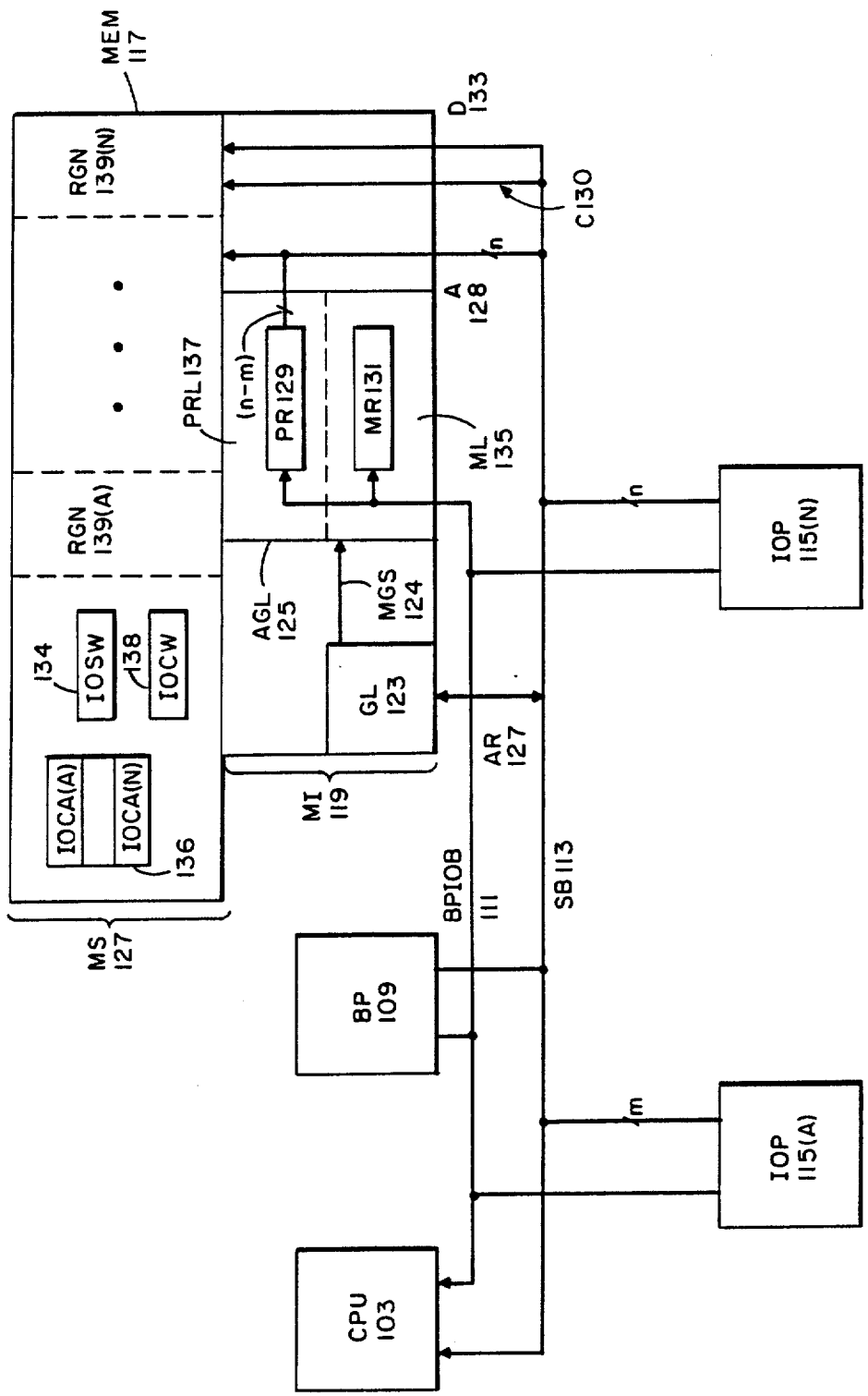
FIG. 1: COMPUTER SYSTEM 101

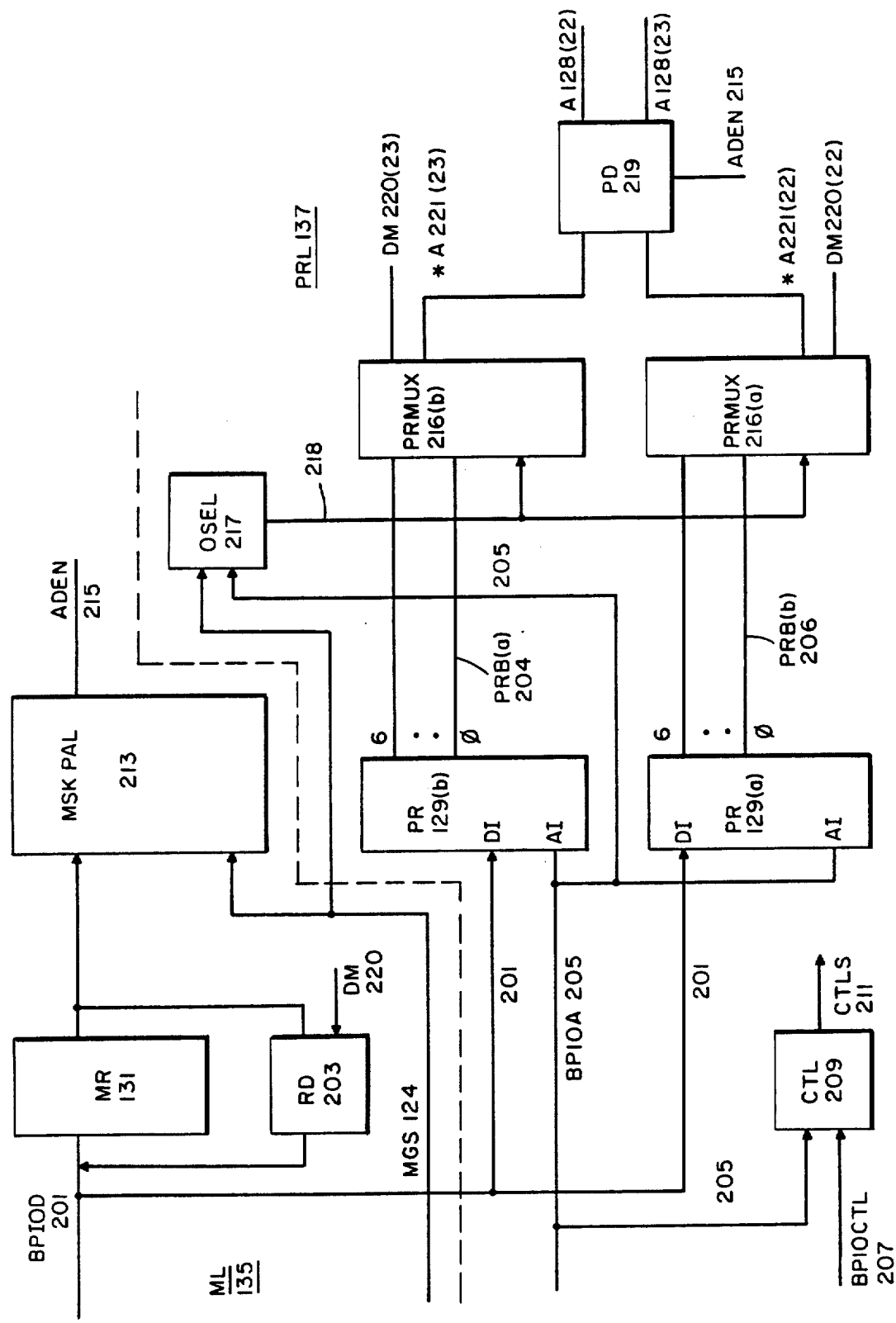
FIG. 2: DETAIL OF AGL 125

MEMORY ADDRESS GENERATOR WITH DEVICE ADDRESS TYPE SPECIFIER

BACKGROUND OF THE INVENTION

1. Field of the Invention

The present invention relates to data processing systems and more particularly to data processing systems wherein a plurality of devices are coupled by means of a common bus to a memory and directly access the memory by way of the bus.

2. Description of the Prior Art

Many prior art computer systems have architectures in which a plurality of devices and memory are connected to a common system bus and in which each of the devices is able to directly access memory via the bus. Typically, one of the devices is a CPU which executes programs stored in memory and in response to the programs, performs arithmetic and logical operations on data stored in memory and moves data from one memory location to another. Other of the devices are I/O processors. Each I/O processor has one or more I/O devices such as terminals or disk drives attached to it and transfers data between the I/O devices and memory in response to I/O commands from the CPU. An example of such a computer system is the VS 65 built by Wang Laboratories, Inc.

In recent years, the price of memory has dropped dramatically. As a consequence, even low cost systems may have large memories. However, a large memory requires a large number of bits to address it, and consequently, the increase in memory size has been accompanied by an increase in the size of addresses. In computer systems having architectures like the one described above, an increase in memory size has required that the system designer choose between two unattractive alternatives: reimplementing all of the devices connected to the system bus so that they can generate the larger addresses or limiting devices which generate smaller addresses to those portions of memory which are addressable by means of such addresses. The invention described in the present application solves the above problem and makes it possible for devices which generate smaller addresses to access the entire memory.

SUMMARY OF THE INVENTION

The present invention solves the above problem of the prior art by providing address generation apparatus which includes device identification means for determining which of the devices which have m bit addresses smaller than the n bit addresses required to access the entire memory presently is generating an address on the sytem bus and prefix providing means which is coupled to the address lines representing the (n−m) most significant address bits and to the device identification means and which includes a prefix register associated with each of the devices having n-bit addresses The register associated with a device contains an (n−m)-bit address prefix associated with the device. The prefix providing means responds to a specification of a given one of the devices by outputting the prefix associated with the given device to the (n−m) most significant address lines so that the n-bit address on the address lines is formed from the m address bits received from the given device and the (n−m) bits received from the prefix providing means.

In other aspects of the invention, the system includes bus arbitration logic for determining which of the devices requesting control of the system bus. The device identification means is responsive to the arbitration logic and specifies the device to which the arbitration logic gives control of the bus. The prefix providing means further includes masking means connected to the device identification means and to the prefix providing means for inhibiting output of the prefix when the device identification means identifies certain ones of the devices. The digital computer system further includes means for loading a mask register in the masking means and the prefix registers and reading the contents of the mask register and the prefix registers. A prefix establishes a relationship between the device associated with it and a region of memory, and the relationship may be changed by reloading the associated prefix register. The loading means is connected by a separate bus to the address generation apparatus, and consequently, the prefix registers may be loaded during memory operation.

It is thus an object of the invention to provide an improved digital computer system;

It is another object of the invention to provide a computer system in which a plurality of devices having different address sizes may be connected to a common bus and memory;

It is a further object of the invention to provide address generation logic for adding prefixes to the addresses provided by certain devices connected to a bus;

It is an additional object of the invention to provide address generation logic in which the prefixes are obtained from loadable prefix registers;

It is yet another object of the invention to provide address generation logic which contains means for inhibiting the output of prefixes for certain of the devices; and It is a still further object of the invention to provide address generation logic in which the means for inhibiting the output of prefixes is a loadable mask register.

These and other objects of the invention will be understood by those of ordinary skill in the art after referring to the detailed description of a preferred embodiment contained herein and to the drawings, wherein:

BRIEF DESCRIPTION OF DRAWINGS

FIG. 1 is an Overview of computer system 101 containing the address generation apparatus; and FIG. 2 is a detailed block diagram of address generation logic 125.

The most significant digit of the reference numbers refers to the number of the drawing in which the item indicated by the reference number first appears; the remaining digits are item numbers within that drawing.

DESCRIPTION OF A PREFERRED EMBODIMENT

The following description will first present an overview of the computer system in which the preferred embodiment of the invention is implemented and of the operation of the invention in the computer system and will then present a detailed description of the invention's implementation in the preferred embodiment.

1. Overview of the Computer System of the Preferred Embodiment: FIG. 1

The preferred embodiment of the invention described herein is implemented in a VS 75E computer system, manufactured by Wang Laboratories, Inc. FIG. 1 is a block diagram of the VS 75E computer system. The system includes a single CPU 103, a single bus processor (BP) 109, a single main memory (MEM) 117, and up to 6 input/output processors (IOPs) 115, which transfer data between peripheral devices attached to the IOPs and MEM 117. All components of the system are connected by a system bus 113 which transfers addresses, memory commands, and data from the other components to MEM 117 and data from MEM 117 to the other components. Additionally, the components are connected by bus processor I/O bus (BPIOB) 111, which permits communication between BP 109 and the other components independently of SB 113.

CPU 103 executes instructions from programs stored in MEM 117. Certain of the instructions specify I/O operations. The I/O operations are performed by IOPs 115 under control of BP 109. The manner in which CPU 103, BP 109, an IOP 115, and MEM 117 cooperate to perform an I/O operation in response to I/O instructions may be seen from the following description of an operation which writes data from MEM 117 to a peripheral attached to IOP 115(a). The operation involves a number of data structures in MEM 117. The first of these is I/O command word (IOCW) 138, which specifies an I/O operation and the starting address and size of the location in MEM 117 from which data is to be read or to which data is to be written. The next one is I/O command address (IOCA) 136. MEM 117 contains an array of IOCAs 136, one for each IOP 115 attached to the system. The location of the array of IOCAs 136 is known to BP 109. When an I/O operation is to be performed using a given IOP 115, the address for the IOCW 138 defining the operation is contained in the IOP 115's IOCA 136. Input/output status word (IOSW) 134, finally, is at a special location in MEM 117 known to BP 109 and contains the status resulting from the last I/O operation performed by system 101. CPU 103 begins a write operation by writing an I/O command word (IOCW) 138 specifying the operation to MEM 117. Next, CPU 103 writes the address of IOCW 138 to IOCA 136(a) for IOP 115(a). Finally, CPU 103 places a device code for IOP 115(a) in a register in CPU 103 and executes a start I/O (SIO) instruction specifying the register.

In response to the SIO instruction, CPU 103 provides an interrupt and the device code to BP 109 via lines in BPIOB 111. BP 109 then uses the device code to locate IOCA(a) 136 for IOP 115(a) in MEM 117, uses the pointer contained in IOCA(a) 136 to locate IOCW 138 for the I/O operation, and loads IOP 115(a) via BPIOB 111 with data indicating that a write is to be performed to one of the peripherals attached to IOP 115(a) and including the starting address and length of the location in MEM 117 of the data to be written. IOP 115(a) then transfers data from the location in MEM 117 to the peripheral without further intervention from BP 109 until all of the data at the specified location has been transferred. On each read from MEM 117, IOP 115(a) contends with the other devices attached to SB 113 for control of SB 113. When IOP 115(a) gains control, it provides the address of the next portion of the data to be read and a read command to SB 113 and transfers the data it receives from SB 113 to the peripheral. After each read, IOP 115(a) updates the address it uses for the next read by the size of the data just read. On completion of the operation, IOP 115(a) generates an interrupt via BPIOB 111 to BP 109, which reads registers in IOP 115(a) to determine the status of the operation and writes the status to IOSW 134. BP 109 then interrupts CPU 103 via BPIOB 111, and in response to the interrupt, CPU 103 reads IOSW 134.

In addition to its role in I/O operations, BP 109 initializes the other components of system 101 via BPIOB 111 and performs diagnostic operations. As part of initialization, BP 109 downloads microcode to CPU 103 and the IOPs 115. Further, as will be described in more detail hereinafter, BP 109 can read to and write from components of the address generation apparatus of the present invention. BPIOB 111 accordingly has address lines which carry addresses of memory and registers internal to CPU 103, IOPs 115, and MEM 117, data lines which carry data read to or written from these registers and memory, and control lines specifying read and write operations and interrupts of BP 109 by CPU 103, of CPU 103 by BP 109, and of BP 109 by the IOPs 115.

SB 113 has the following sets of lines:
command lines (C) 130 which carry memory command codes.
address lines (A) 128, which carry memory addresses. In a preferred embodiment, there are 24 address lines numbered 0..23.
data lines (D) 133, which carry data.
arbitration lines (AR) 127, which carry signals arbitrating access to system bus 113.

Some IOPs 115 in the preferred embodiment generate addresses which contain a number of bits m which is less than the number of address lines n in address lines 129; others generate addresses having n bits. In a preferred embodiment, a given IOP 115 will generate either a 22-bit or a 24 bit address. The ones which generate 22-bit addresses are connected to address lines 0..21. Arbitration lines 127 include request lines carrying signals indicating which of the processor connected to SB 113 presently is requesting control of SB 113 and grant lines carrying signals indicating which processor presently has control of SB 113. Arbitration is performed by grant logic (GL) 123 in MEM 117.

MEM 117 has two functional parts: memory storage (MS) 121, which stores and outputs data in response to addresses and memory commands, and memory interface (MI) 119, which serves as the interface between SB 113 and MEM 117. For purposes of the present discussion, MI 119 includes GL 123, discussed above, and address generation logic (AGL) 125. AGL 125 supplies the additional m−n bits which must be added to the m bit addresses to form n-bit addresses. In the preferred embodiment, AGL 125 supplies 2 bit prefixes which are output to address lines 22 and 23, which carry the two most significant bits of the address.

AGL 125 is connected to GL 123, to address lines A 128 of SB 113, and to BPIOB 111 and has two main components: prefix logic (PRL) 137 and mask logic (ML) 135. PRL 137 provides prefix bits associated with a given IOP 115 which generates 22 bit addresses to lines 22 and 23 of A 128 when GL 123 grants that IOP 115 control of SB 113. Signals indicating which IOP 115 has been given control are received via memory grant signals (MGS) 124 from GL 123. The bits are contained in prefix registers (PR) 129, which in a preferred embodiment contains 6 2-bit registers, one for each of the IOPs 115 which may be connected to SB 113. The association between an IOP 115 and a given register in PR 129 is determined by the device code for the IOP 115. Thus, if IOP 115 has device code 0, register 0 in PR 129 will contain the prefix for that IOP 115. Mask logic 135 inhibits PRL 137 from providing prefixes for IOPs 115 which themselves generate 24-bit addresses. The IOPs 115 for which prefixes are provided is determined by mask register (MR) 131, which contains a bit for each IOP 115. Association between an IOP 115 and the bit is determined by the IOP 115's device code. When the bit is set to indicate that a given IOP 115 generates 24- bit addresses, AGL 125 is inhibited from outputting bits 22 and 23 to A 128 when MGS 124 indicates that the given IOP 115 has control of the bus. As can be seen from Fig. 1, both PR 129 and MR 131 are connected by BPIOB 111 to BP 109. Consequently, prefix and mask bits may be loaded from BP 109 and read by BP 109. Since BPIOB 111 is separate from SB 113, PR 129 may be written while MEM 117 is performing memory operations in response to commands and addresses on SB 113.

In a preferred embodiment, MS 121 has a capacity of 16 MB and addresses on SB 113 specify bytes. A 22-bit address can specify 4 MB of the 16 MB. The two bit prefix specifies one of four 4 MB regions (RGN) 139 of MS 121. In associating an IOP 115 which generates 22-bit addresses with a two bit prefix, PRL 137 also associates the IOP 115 with the RGN 139 specified by the prefix. All memory operations performed by that IOP 115 will take place within the RGN 139 specified by the prefix. Since PR 129 is loadable from BP 109, the association between a RGN 139 and an IOP 115 may change during operation of computer system 101. For example, an IOCW 138 for an I/O operation may specify a source or destination for data in MEM 117 which is not in RGN 139 presently associated with the IOP 115 which is to perform the specified I/O operation. In that situation, BP 109 will change the contents of the prefix register for the IOP 115 in PR 129 so that the RGN 139 specified therein contains the specified source or destination.

Operation of AGL 125 is as follows: on initialization of system 101, BP 109 determines the characteristics of the IOPs 115 connected to SB 113. Included in those characteristics is whether the IOP 115 generates 22- or 24 bit addresses, and BP 109 sets the bit in MR 131 corresponding to each IOP to indicate which kind of addresses the IOP 115 generates. In the case of IOPs 115 generating 22-bit addresses, BP 109 responds to an SIO instruction specifying one of those IOPs 115 by setting the bits associated with the IOP 115 in PR 129 from the two most significant bits of the start address in IOCW 137 so that the addresses formed from the prefix and the bits received from the IOP 115 specify the RGN 139 containing the data. Since BP 109 has access to PR 129 via BPIOB 111 and will not enable the IOP 115 to perform I/O until it has been set up, other IOPs 115 and CPU 103 may access MEM 117 while BP 109 is setting the bits. Next, BP 109 sets up the IOP 115 to perform the memory operation as previously described. The start address provided to the IOP 115 is the remaining bits of the start address in IOCW 137. Once set up, IOP 115 contends with the other IOPs 115 for control of SB 113. Each time GL 123 grants SB 113 to an IOP 115, it provides MGS 124 to AGL 125 specifying the IOP 115 which has control. If the bit in MR 131 for that IOP 115 indicates that no prefix is to be output, AGL 125 outputs nothing to address lines A 128(22,23). If the bit indicates that a prefix is to be output, AGL 125 outputs the prefix associated with the IOP 115 specified by MGS 124 to address lines A 128(22,23).

2. Detailed Description of AGL 128 FIG. 2

FIG. 2 is a detailed block diagram of AGL 125. AGL 125 receives as its inputs BPIOB 111 and MGS 124 and produces as outputs A 128(22), A 128(23), and data on BPIOB 111. For purposes of clarity, BPIOB 111 is shown in Fig. 2 as consisting of three sub busses: BPIO data (BPIOD) 201, which carries data between BP 109 and other components of system 101, BPIO address (BPIOA) 205, which carries the addresses by means of which BP 109 addresses registers in the components of system 101, and BPIO control (BPIOCTL) 207, which carries control signals. The control signals relevant to the present discussion specify the following:

that BP 109 is reading from a register in an IOP 115 or MEM 117;

that BP 109 is writing to a register in an IOP 115 or MEM 117; and that BP 109 is enabling operation of a component of an IOP 115 or MEM 117.

Components being read to or written from or being enabled are specified by addresses on BPIOA 205. The control logic required for AGL 125 to perform the functions described herein is obvious to those skilled in the art and are represented by CTL 209, which receives inputs from BPIOCTL 207 and BPIOA 205 and outputs control signals (CTLS) 211 as required to perform the specified operations to the other components of AGL 125. Included in CTL 209 is a latch which retains state indicating whether BP 109 has enabled AGL 125 to output prefixes to A 128. The latch permits AGL 125 to be simultaneously enabled for outputting prefixes and to perform write operations on individual prefix registers in PR 129.

Continuing with mask logic (ML) 135, ML 135 has three component in a preferred embodiment: mask register (MR) 131, which contains a mask bit for each IOP 115, mask programmable array logic (MSKPAL) 213, and read driver (RD) 203. MR 131 receives mask bits via BPIOD 201 and provides them to MSKPAL 213 and to RD 203. MSKPAL 213 receives MGS 124 in addition to the mask bits and outputs ADEN signal 215 indicating whether a prefix is to be output to A 128. RD 203 receives the mask bits from MR 131 and a prefix from PR 129 and provides them to BPIOD 201, thereby permitting BP 109 to read MR 131 and prefix registers in PR 129. Operation of ML 135 is as follows: MR 131 is always enabled for output; when BP 109 has enabled AGL 125 to output prefixes, CTL 209 enables output from MSKPAL 213, so that MSKPAL 213 responds to MGS 124 by outputting ADEN 215 as described above. When BP 109 specifies a write operation on MR 131 and provides the address of MR 131 on BPIOA 205 and the mask bits on BPIOD 201, CTL 209 produces a signal enabling MR 131 to receive and store the data. When BP 109 specifies a read operation and provides the address of MR 131, signal from CTL 209 enables RD 203 to output its contents to BPIOD 201.

Address generation logic (AGL) 125 has six components: PR 129(a) and (b), which together make up PR 129, OSEL 217, which contains logic determining which address prefix will be output to A 128(22 and 23), PRMUX 216(a) and PRMUX 216(b), which select one prefix for output to A 128, and prefix driver (PD) 219, which outputs the selected prefix to A 128(22 and 23). PR 129(a) and (b) are 1×8 bit latches which output all 8 bits simultaneously and are always output enabled. The latches have a 1- bit data input and address inputs and are loaded by providing a write anable signal and specifying the address of the bit to be set on the address lines and the input on the data line. As shown in FIG. 2, the data bit comes from a line of BPIOD 201 and the address bits come from BPIOA 205. In the preferred embodiment, PR 129(a) contains bit 22 of each prefix and PR 129(b) contains bit 23.

PRMUX 216(a) and (b) receive prefix bits PRB(a) 204 and PRB(b) 206 from PR 129(a) and (b) and select one of the 8 bits for output. The complement of the selected bit is output at *A 221(23) and *A221(22) respectively, and the selected bit is output at DM 220(22 and 23), which are in turn inputs to RD 203. Selection is controlled by inputs from OSEL 217, which specifies which prefix is to be selected by PRIMUX 216 (a) and (b) in response to MGS 124 specifying which IOP 115 presently is controlling the bus or to address signals on BPIOA 205. Actual output of the prefix bits to A 128 (22 and 23), finally, is controlled by PD 219, which outputs them to A 128 when enabled by ADEN 215 generated by MSKPAL 213 in response to the mask bits and MGS 124. PD 219 is a tristate device, and does not place any values on A 129(22 and 23) when it is not enabled.

Operation of PRL 137 is as follows: when BP 109 has enabled AGL 125 to output prefixes, a signal from CTLS 211 enables MSPAL 213 to output ADEN 215 and another signal from CTLS 211 enables OSEL 217 to respond to MGS 124. In response thereto, OSEL 217 outputs signals to PRMUX 216(a) and (b) selecting one of the 6 prefix bits stored in each of PR 129(a) and (b), and thereby selecting a prefix for output to PD 219. If ADEN 215 indicates that that prefix was not masked by a bit in MR 131, PD 219 is enabled and outputs the prefix to A 128. When BP 109 specifies a write operation to PR 129, BPIOCTL 207 carries a write signal, BPIOA 205 carries the address of a prefix register, and BPIOD 201 carries two bits of data on the lines which serve as data inputs to BR 129(a) and (b) respectively. In response to the write signal and the address, CTL 209 generates control signals which enable PR 129(a) and (b) to write the input bits at the locations specified by the address. The write operation on one prefix register does not affect output of prefixes from the remaining prefix registers, thus permitting AGL 125 to provide prefixes for other devices during the write operation. When BP 109 specifies a read operation which reads a prefix register, BPIOCTL 207 specifies the read operation and BPIOA 205 carries the address of the prefix register to be read. CTL 209 produces a signal which causes OSEL 217 to employ the address on BPIOA 205 to select the prefix register whose contents are output by PRMUX 216(a) and (b). MSKPAL 213 is not enabled for output during the read operation, so there is no output of the bits to A 128. However, CTL 209 has also enabled RD 203 in response to the read operation, and consequently, bits DM 219(22) and (23) are driven onto BPIOD 201 for reading by BP 109.

3. Conclusion

The foregoing Description of a Preferred Embodiment has disclosed how one skilled in the art may construct and use address generation apparatus which generates address prefixes and thereby permits devices which generate addresses containing less than n bits to access a memory which requires n bit addresses via a bus having n address lines. The Description has also disclosed apparatus for specifying which of a plurality of devices require that the apparatus generate address prefixes and apparatus for resetting the address prefixes so that a given device may address different areas of memory.

While the embodiment described herein represents the best mode presently known to the inventors for practicing the invention, other embodiments may be constructed which employ the principles described herein but differ from the disclosed embodiment. For example, devices other than processors may generate address bits. Further, the prefix may contain more or fewer bits, and different devices may rreceive prefixes of different lengths. Moreover, the device which requires the prefix may be specified by means other than the grant logic employed for that purpose in the present embodiment. Changes which will be obvious to those skilled in the art will further permit different devices to have prefixes of different sizes. Additionally, other embodiments may not include a mask register, and in others, the prefixes may not be loadable. Finally, other embodiments may not have a bus processor or a bus processor I/O bus. In such embodiments, the prefix register and the mask register may be read and loaded by the CPU instead of by a specialized bus processor and reading and loading may be done via a system bus instead of a special bus.

The invention is thus illustrated by the embodiment disclosed in the Description of a Preferred Embodiment but is not limited by the embodiment. The invention s scope is instead determined by the appended claims and includes all embodiments which come within the meaning and range of equivalency of the claims.

What is claimed is:

1. Address generating apparatus for generating n-bit addresses for use in a digital computer system in which a computer system memory and each of a plurality of devices is connected to a system bus having address lines for carrying memory addresses of at least n bits and bus request lines for carrying bus request signals indicating which of the devices is contending for control of the system bus, the bus request lines are connected to bus grant logic which indicates which of the devices is to receive control of the system bus, and first certain of the devices generate memory requests containing m-bit addresses where m < n and second certain of the devices generate memory requests containing n-bit addresses, the addresses generating apparatus comprising:
masking means including
mask register means for storing and outputting mask bits, each mask bit being associated with a device and serving to indicate whether the associated device generates an m-bit address or an n-bit address and
mask logic means connected to the mask register means and to the bus grant logic for receiving the mask bits and outputting an enabling signal when the mask bit associated with the contending device to which the bus grant logic has given control of the system bus indicates that the device to which control has been given generates an m-bit address; and
prefix providing means including
prefix register means for storing and outputting (n−m)-bit prefixes, each prefix being associated with a device;
prefix selection means connected to the bus grant logic and to the outputs of the prefix register means for selecting the prefix associated with the device to which the bus grant logic has presently given control of the system bus; and prefix output enabling means connected to the mask logic, to the prefix selection means, and to the address lines carrying the (n−m) most significant bits of the memory address for receiving the selected prefix and outputting the selected prefix to those address lines in response to the enabling signal, whereby a device which generates m-bit addresses may address any region in memory addressable with n-bit addresses.

2. Address generating apparatus for generating n-bit addresses for use in a digital computer system in which a computer system memory and a plurality of devices are connected to a system bus having address lines for carrying addresses of at least n bits, the devices may contend for access to the system bus and access is granted thereto by bus grant logic, and first certain of the devices generate addresses containing m bits where m<n and second certain of the devices generate addresses containing n bits, the address generating apparatus comprising:

device address type specification means for specifying whether a given device generates m-bit addresses or n-bit addresses;

address prefix storage means coupled tot he system bus for storing an (n−m)-bit prefix for each of the devices; and prefix outputting means connected to the address prefix storage means and responsive to the bus grant logic and to the device address type specification means for causing the prefix for the device which currently has access to the system bus to be output from the address prefix storage means to the address lines carrying the (n−m) most significant bits of the memory address when the device address type specification means indicates that that device generates m-bit addresses.

3. The address generating apparatus set forth in claim 2 and further comprising:

device address type loading means connected to the device address type specification means for loading data specifying the types of the devices into the device address type specification means.

4. The address generating apparatus set forth in claim 3 wherein:

the device address type loading means is a bus processor which is connected to the device address type specification means by bus processor bus means which are independent of the system bus.

5. The address generating apparatus set forth in claim 2 and further comprising:

prefix loading means connected to the address prefix storage means for loading the prefixes into the address prefix storage means.

6. The address generating apparatus set forth in claim 5 and wherein:

the prefixes are individually loadable.

7. The address generating apparatus set forth in claim 6 and wherein:

the prefix loading means is a bus processor which is connected to the address prefix storage means by bus processor bus means which are independent of the system bus.

8. The address generating apparatus set forth in claim 7 and wherein:

the bus processor loads the address prefix storage means with the prefix for a given one of the devices while the prefix outputting means is outputting prefixes for others of the devices.

9. The address generating apparatus set forth in claim 7 wherein:

the bus processor bus means further connects the bus processor to the deices;

the devices further generate addresses on the address bus in response to a command and a starting address received from the bus processor via the bus processor bus; and when the device receiving the command is one of the first certain devices, the bus processor determines a region of the system memory to be addressed by that device, loads the prefix associated with that device in the address prefix storage means, and provides an m-bit address to that device such that the n-bit addresses produced from the m-bit addresses generated by that device and the associated prefix are addresses in the region.

* * * * *